Dec. 31, 1968          J. R. OISHEI          3,419,299
                         WIPER ARM
                      Filed Feb. 14, 1955
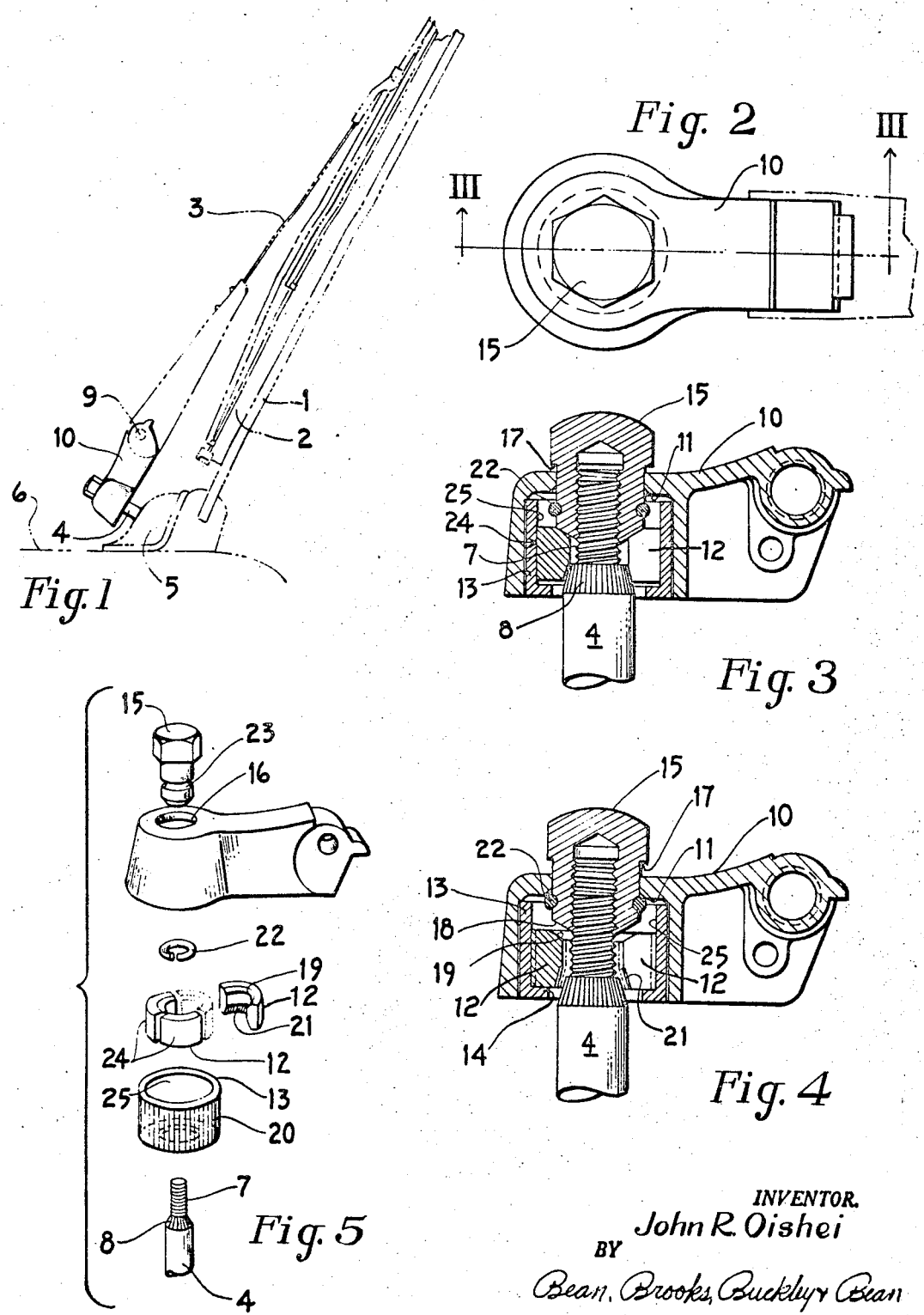
INVENTOR.
John R. Oishei
BY
Bean, Brooks, Buckley & Bean
ATTORNEYS United States Patent Office 3,419,299
Patented Dec. 31, 1968

3,419,299
WIPER ARM
John R. Oishei, Buffalo, N.Y., assignor to Trico Products Corporation, Buffalo, N.Y.
Filed Feb. 14, 1955, Ser. No. 487,964
13 Claims. (Cl. 287—253)

This invention relates to the windshield cleaning art and more particularly to the mounting of the wiper actuating arm upon its oscillatory shaft.

In the earlier makes of windshield cleaners, the wiper carrying arm was connected to its oscillatory shaft in various manners. At first, it was through a simple frictional lack, as by a nut threaded onto the drive shaft to bind it against a shoulder on the shaft. This mode of attachment was subject to slippage incidental to restrictions in the available surface contact areas. Later, the shaft shoulder was provided with a serrated surface with which mating portions on the arm interengaged to afford a positive interlock. This was practical with pneumatic power where sufficient overtravel in the fluid motor drive would enable the wiping blade to be parked against the windshield framing. However, this positive interlock would not necessarily permit a close parking of the wiping blade when driven by an electric motor through a reduction gearing transmission. Therefore, the electrically operated windshield cleaners have been at a disadvantage in not having the overtravel found in fluid motor drives and hence the adjustability of the arm on the electrically driven shaft has been in increments of angular displacement equal to the distance between the teeth or serrations on the arm shoulder.

In an earlier British Patent No. 672,698 there is shown a positive interlock with a shaft shoulder in which the collet member is integral throughout and carries on its periphery means for positively interlocking with the arm head, such double interlock being subject to definite increments of angular adjustment but failing to provide an infinite adjustment. Hench the adjustability of the arm on the shaft imposes a finer calibration. Previous to this British patent disclosure a tapered spring ring split at one side had been utilized for wedging between the arm head and the shaft to effect an infinite adjustment, but the only expansive clutching action is achieved on the ends of the collet adjacent the cut or split; the ring portion opposite the cut being less yieldable under the axially applied pressure and therefore offering no hold on the shaft. Again, resort was made to an arrangement which utilized biting edges that would cut into the clutch surface to mar and deface it, and when once the surface was fractured and gouged out, the possibility of making a minute readjustment would be remote because of the roughened clutch face.

Arm couplings having infinite adjustments of the arms upon its shafts are desirable but the clutch surfaces must be smooth in order to secure the arm in its most desired position when found. A friction type clutch should be used for this purpose but its clutching hold has heretofore been limited. The advent of the curved windshield necessitated longer and heavier arms and blades and would overload the ordinary collet clutch because of its limitations. Adjustment and readjustment must be permitted without surface defacement and mutilation. The clutch faces must be maintained smooth at all times to provide the required exactness of adjustment for parking the wiper along the bottom of the windshield frame.

The primary object of the invention is to provide such an arm coupling that is wholly dependable; one which is especially adapted for windshield cleaners having wiper actuating shafts formed with serrated shoulders, though not confined thereto, wherein an infinite arm adjustment is afforded to facilitate the placement of the wiper on the windsield with an exactness to insure a proper parking whenever the source of power is disconnected.

In the present construction, an annular series of friction shoes, preferably three in number, is arranged about the wiper shaft, each shoe being individually free to bodily move independently of the others in a radial direction. These friction shoes are designed to afford a maximum surface expanse by which an effective frictional securement of the arm to the shaft is provided for moving the heavier wiper arms and blades but is nevertheless readily releasable to permit the minutest adjustment at the outer end of the arm. The shoes may be confined within a cage or drum-like container press-fitted into the arm head to hold the component parts in a permanently associated unit. Each shoe is further designed to effect a positive driving interlock with the shaft for cooperating with the radially outward friction drive of greater leverage and infinite adjustability.

The desirable infinite adjustment is obtainable in a practical manner by smooth non-fracturing defacement of the contacting surfaces so as to move the parts in relation to each other in increments of minute degree back and forth any number of times required to make the adjustment by an initial interlock and the subsequent interlocking adjustments required. The accomplishment is possible only by maintaining the faces of the clutching parts in unmarred condition so that the interlocking clutching position leaves no obstruction to minute readjustment. The accomplishment of this clutching is provided for in a manner that will always bring the contacting faces into interlocked relationship and uniform radially extending planes of movement where each section of the expanding clutch member will contact the corresponding surface thereabout for interlocking therewith through movement that is always substantially negotiated in straight line radial movement about a common center.

In this manner smooth surface contact is made available in uniform movement of divided arcuate shaped shoes, each being dependent upon the other for its proportion of pressure exerted on its inner face to cause the shoe to be moved into forceful interlocking smooth contact within the smooth surfaces of a confining ring encircling the shoes for a complete 360°. The plural multiple shoes may be used to effect non-fracturing interlock within the smooth confining ring surface and without any fracture or marring of the surfaces of either the shoes or rings of any consequency in achieving final interlocking. The parts described may be moved any number of times to achieve multiple adjustable position required to bring the position of the wiper arm to exactly the right position to permit parking of the blade closer to the windshield molding the purpose of which the adjustment of the arm head is required. The structure is one in which the shoe portions are accurately formed on a true radius. As the expansion of the divided wedge pressure is exerted on the inner surfaces of the shoe, each of the shoes will move in a true radial direction without any edge contacting angle and without any portion of the cooperating friction faces becoming mutilated or defaced. The shoes compose a substantially uninterrupted circular face that is subjected axially to a wedging force to expand the clutching shoe unit or assembly outwardly and equally along radial lines stemming from the shaft center, the entire clutching assembly at the same time having a limited axial travel to freely adjust itself to effect a squeeze interlock entirely through the compression of the shoe members upon the surrounding chamber wall or its lining ring.

This permits numerous locking and unlocking operations under the steadying guidance of maintainable friction while making the adjustment in finer increments of movement than obtainable in any other manner for the reason that the surfaces are smooth and are so maintained without fracture or penetration of one member into the other. Reliance is entirely upon the expansive force which puts the shoes under compression and the confining ring under stretch, such expansive force being held by the camming action of the threaded shaft and nut.

Again, it is an object of the invention to provide an improved arm coupling having a positive interlock with the shaft and also a much desired infinite adjustment through a frictional hold by which the wiper arm may be positioned for proper parking, the arrangement being such that the proper parking position may be readily obtained without disturbing the positive interlock.

Further, the invention relates to an arm coupling having a driving connection with the drive shaft and an infinite adjustability of the arm through a greater leverage and over a larger surface area of frictional contact by which an effective frictional clutching action is accomplished.

The foregoing and other objects will manifest themselves as this description progresses, reference being had to the accompanying drawing, wherein FIG. 1 is a view showing the improved wiper arm in its operative position upon a windshield;

FIG. 2 is a fragmentary plan view of the improved arm;

FIG. 3 is a longitudinal sectional view about on line III—III of FIG. 2 with the pivot shaft being left in elevation and showing the clutch parts in their operative position;

FIG. 4 is a similar view but depicting the clutch parts in their inoperative position and the arm being withdrawn from the shaft shoulder; and FIG. 5 is an exploded view of the arm parts.

Referring more particularly to the accompanying drawing, the numeral 1 designates a curved windshield having a surface conforming flexible wiper 2 supported thereon by an arm 3 that is fixed to an oscillatory shaft 4, the latter being journaled in a fitting 5 on a cowl 6 at the lower side of the windshield. The shaft 4 has its outer end threaded at 7 and inwardly of the thread is formed with a conical shoulder 8. This shaft formation is generally in the present day electric windshield cleaner. The arm 3 is articulated and has its outer wiper carrying section hinged by a pin 9 to a die-cast mounting head 10.

The arm head 10 has a shaft receiving opening in the form of a clutch chamber or socket 11 for holding an expansible clutch unit. This clutch unit embodies a plurality of shoes or jaws 12 loosely arranged about the shaft for independent bodily movement along radial lines. The socket 11 opens toward the shoulder 8 to receive a cup-shaped drum-like cage serving as a liner 13, of steel or other suitable material, for giving added support to the encircling die-cast socket wall, which wall is subject to cold flow. The exposed end of the reinforcing liner is turned inwardly to provide a retaining flange 14 for confining the clutch shoes 12 against unauthorized displacement.

A pressure applying member in the form of a clamping nut 15 is accessible through an opening 16 in the bottom wall of the socket 11. This opening is coaxial with the clutch chamber and when the arm head is placed over the end of the shaft, the latter will first penetrate the expansible clutch unit and then enter the opening 16 to expose the thread for receiving the nut. The nut is provided with an overhanging shoulder 17 which overlaps the outer face of the head and may have sufficient clearance for proper functioning. The inner end of the nut 15 is provided with a conical or tapered nose 18 that is designed to engage a set of beveled seats 19 at the inner ends of the shoes 12 to wedge them apart and against the inner face 25 of the steel liner, the latter having its periphery serrated or fluted at 20 for interlocking with the encircling die-cast wall of the socket when press-fitted thereinto.

The outer ends of the shoes 12 are also provided with beveled faces 21 adapted to seat upon the tapered shoulder 8 and exert an outwardly expansive force upon the shoes. Thus, the shoes are jointly acted upon by a double wedging action to effect a uniform radial movement to the shoes for a firm clutching grip upon the liner.

By this construction the active face of the clutch unit is effectively increased to take the load of the heavier arm and blade. This increase is accomplished by extending or offsetting the shoes lengthwise or in an axial direction and away from the positive interlock with the shaft. A balanced support for the shoes is then accomplished by bringing the nose 18 down upon the inner ends of the shoes. Thus, the surface area of contact may be increased by varying the size of the shoe faces.

The arm-shaft coupling employs dual clutches, one in the nature of a friction clutch having ample clutch face expanse for infinite arm adjustment, and the other a positive clutch having definite increments of interlocking adjustment for positive transmission of the driving torque. The shoes 12 are active in both clutching actions. The tapered face 8 and 18 oppose each other and when one moves toward the other they will squeeze in a balanced manner upon the freely movable shoes and spread them evenly apart to bring their active peripheral faces 24 of relatively large expanse fully into frictional binding contact with the inner peripheral face 25 of the steel-lined clutch chamber. This frictional engagement occurs radially outward with respect to the serrated shoulder 8 to gain a lever advantage for augmented pressure in the arm-friction clutching action of infinite adjustment. During the expansion of the dual clutch unit the outer beveled faces 21 remain in splined connection with the shaft through the intermeshing serrations of the positive interlock. Upon the placement of the arm upon the shaft, the loosely confined shoes will be free to adjust themselves on the opposing serrations of the shoulder to interlock therewith and constrain the shoes against movement about the shaft as the nut is manipulated in either direction.

A split ring 22 is engaged in a peripheral groove 23 in the inner end of the nut to preclude accidental displacement of the nut from the arm head. This locking ring will further serve as an internal shoulder to abut the bottom wall of the socket and exert a lifting force upon the head axially of the shaft to disengage the shoes from the serrated shoulder 8 when the nut is unscrewed to a predetermined extent.

In operation, the arm is mounted on its actuating shaft by simply placing the head, with its self-contained expansible clutch unit, over the threaded end of the shaft to interlock the serrated face 21 of the clutch shoes with the shoulder serrations. This provides a positive interlock between the dual-clutch unit and the shaft to hold the clutch unit nonrotatable as the nut is next applied to the shaft thread 7 and tightened to expand the shoes against the surrounding socket wall.

To adjust the arm on its shaft for properly parking the wiping blade, it is only necessary to slightly loosen the nut sufficiently to free the clutching engagement between the active faces 24 and 25, after which the arm may be rotated about the shaft axis to its proper position, followed by a retightening of the nut to again render the clutch unit operative.

With the arrangement herein described, the opposing beveled faces of the shaft shoulder and the nut will engage the two sets of beveled internal faces 19 and 21 on the opposite ends of the shoes to expand the friction clutch to its operative positive. The number of shoes employed may be varied more or less to suit the engineering requirements for rapidly expanding and contracting them to and from their maximum diameter in a guided manner. The arm securement is effected without injury to the operating shaft or the clutch faces through a greater leverage to effect a non-slipping friction grip. The dual clutch construction is simple and economical and is effective for maintaining its given adjustment. The expanders or shoes 12 have their faces concentric to the axis of the shaft for securing full facial contact with the chamber wall 25 which is likewise concentric to the shaft. The shoe faces, therefore, jointly form a composite clutch face that is substantially annular for securing full facial contact with the chamber wall for firmly holding the arm relative to the shaft as the wiper is oscillated back and forth. This is advantageous over the split ring type of collet wherein there is a tendency for each end of the split ring to alternately grab and loosen. As a result the inertia factor has developed to a great extent. This is accentuated by the blade travel on the wrap around glass when, at the end of the outboard stroke, the weight of the blade is dropped off from the crest outwardly and downwardly, reaching its maximum velocity at the point of reversal. The result is a hammer-like action at the end of the outboard stroke that is relatively heavier than the inertia effort at the end of the inboard stroke. In both directions of movement the inertia factor tends to operate to transmit torque from the arm through the split clutch ring to the shaft. Any resiliency between the interlocking clutch parts is subjected to the greater repetitive force in one direction of the oscillating motion. The tendency, therefore, is to loosen the grip upon the shaft, contrast to the circumferentially spaced rigid clutch elements which provide a balanced clutching action that serves to secure the arm and shaft firmly together.

While the foregoing description has been given in detail, it is without thought of limitation since the inventive principles involved are capable of assuming other physical embodiments without departing from the spirit of the invention and the scope of the appended claims.

What is claimed is:

1. A windshield wiper carrying arm for mounting on an oscillatory shaft having a serrated shoulder and an adjoining threaded end, said wiper carrying arm having a mounting head formed with a shaft receiving chamber having a smooth clutch wall, an expansible series of rigid clutch shoes independently operated and having smooth active faces engaging the smooth clutch wall, shoe-confining means supporting the shoes within the chamber, said shoes having one end interlockingly connected to the serrated shoulder, and a clamping nut engaged with the threaded end of the shaft and effectively engaging the other ends of the clutch shoes to thereby cause said clutch shoes to expand and exert a radial force against the smooth inner wall when said clamping nut is tightened.

2. A wiper carrying arm for mounting on a shaft having a tapered shoulder, said arm having a mounting head formed with a shaft receiving opening and a communicating clutch chamber having an annular wall, an expansible clutch unit comprising radially and independently displaceable friction shoes arranged about the shaft in the chamber and having peripheral friction clutch faces, a liner for the chamber wall having interlocking engagement therewith and serving as a wear plate for engagement by the clutch shoes, means operatively associated with said liner enclosing the independently movable shoes and loosely confining them to the chamber, and means for moving the mounting head axially over the tappered shoulder when associated with such a shaft to radially displace the shoes to their clutching position.

3. A wiper arm mounting construction comprising a wiper arm head having a shaft receiving chamber, a radially expansible multi-sectioned clutch member positioned within said chamber, a shaft in the chamber, a tapered shoulder on said shaft, said member when assembled being positively interlocked to said shoulder on said shaft against rotational movement by mating serrations on said shaft and said member, said member sections being adapted to move independently of each other radially of said shaft and substantially to an equal degree throughout the circumference of said shaft while maintaining the positive interlock, said member being also movable axially of said shaft, means for retaining said member within said chamber, a second member encircling the first member and having an inner peripheral face against which said sections may expand radially to drivingly connect the two members, said second member having means interlockingly engaging with the chamber to hold said second member in assembled relationship in said chamber, and means adapted to be secured to said shaft operable to develop the radial movement of said sections and to substantially the same degree throughout the periphery of said first member and to retain said first member in engagement to a sufficient degree for adjustment of said arm head without disengagement of said clutch member from said shaft.

4. A wiper carrying arm for mounting on a shaft having a tapered shoulder, said arm having a mounting head formed with a shaft receiving clutch chamber, an expansible clutch unit comprising radially displaceable friction shoes arranged about the shaft in the chamber and having peripheral friction clutch faces engageable with a wall of the chamber, means for retaining said shoes within said clutch chamber, said shoes having inner and outer sets of internal beveled faces, the outer set designed to be operatively associated with the tapered shoulder when associated with such a shaft, and a clamp nut rotatable in the mounting head and having an inwardly extending tapered nose opposing such a tapered shoulder when so associated, said nose engageable with the inner set of beveled faces to cooperate with the shoulder to expand the shoes into clutching engagement with the chamber wall.

5. A windshield cleaner having an oscillatory shaft with a tapered shoulder and an adjoining threaded end, a wiper carrying arm having a mounting head formed with a shaft receiving clutch chamber, a series of clutch shoes arranged about the shaft in the chamber and having their outer ends formed with parts slidably interlocking with said shoulder for relative axial movement on the shaft, means for retaining said clutch shoes within the clutch chamber, beveled inner ends on said shoes, and a pressure applying member having a beveled nose opposing the taper of the shoulder and engaging said beveled inner ends of the shoes to cooperate with the shoulder in expanding the shoes bodily against the inner wall of the clutch chamber.

6. A wiper carrying arm having a mounting head formed with a shaft receiving clutch chamber, a series of relatively movable clutch shoes arranged to receive a shaft in the chamber and having cylindrical friction faces and their outer ends formed with beveled seats to engage a tapered shoulder on such shaft, means for retaining said clutch shoes in said chamber, and a pressure applying member having an oppositely beveled nose for opposing the shoulder and engaging the inner ends of the shoes to cooperate with the shoulder in expanding the shoes bodily against an interposed fixed wall of the clutch chamber, the outer ends of the shoes having serrated beveled faces for spline connection to such tapered shoulder to establish a positve driving connection with the series of shoes.

7. A windshield wiper arm to shaft attachment mechanism, comprising a shaft with a tapered shoulder portion and a threaded portion extending outwardly beyond the tapered portion, an arm head having a recess to receive said shaft, an annular series of clutch shoes surrounding said tapered portion of the shaft, a liner fitting in the arm head recess and loosely confining the clutch shoes therein, the inner surface of said clutch shoes being tapered to seat on the tapered shoulder of said shaft, a nut swiveled within the arm head recess and having a shoulder portion projecting outwardly beyond the outer surface of said arm head to receive application of turning force the inner end of said nut effectively bearing against the series of clutch shoes to move them along the tapered shoulder to provide shoe spreading pressure to wedge the shoes between the taper on the shaft and their confining liner within the recess of the arm head by and as a result of the nut being turned inwardly on the threaded portion of the shaft.

8. In a windshield cleaner having an oscillatory shaft with tapered shoulder means, a wiper carrying arm having a diecast mounting head formed with a shaft receiving chamber, a circular series of relatively movable clutch shoes arranged in the chamber about the shaft, a wear cylinder lining the chamber and loosely confining the shoes therein, each shoe having a peripheral and cylindrical friction face and interlocking with the shoulder means for radial expansion against the wear cylinder, and a pressure applying member journaled in the head and engaged with the inner ends of the shoes to maintain the interlock and to expand their peripheral cylindrical friction faces against the encircling wall of the wear cylinder.

9. A windshield cleaner comprising an oscillatory shaft having a tapered shoulder and an adjoining threaded end, a wiper arm having a die-cast mounting head formed with a shaft receiving opening therethrough and a coaxial clutch chamber, a liner press-fitted within the chamber and having a cylindrical wear surface, radially expansible shoes loosely arranged in the liner and supported at their outer ends upon the tapered shoulder on the shaft for being expanded thereby upon the wear surface, means for retaining said shoes within the liner, and a clamping nut journaled in the mounting head and having an inward extension engaged with the threaded end of the shaft, the inward extension opposing the tapered shoulder and engaging the inner ends of the shoes to cooperate therewith in expanding the shoes outwardly against the encircling cylindrical wear surface of the liner.

10. A wiper carrying arm for mounting on a shaft having a tapered shoulder means, said arm having a mounting head formed with a shaft receiving clutch chamber open at its bottom and having an underlying annular portion, an expansible clutch unit comprising radially displaceable friction shoes slidably arranged about the shaft and wholly confined within the clutch chamber, said underlying annular portion serving to retain said shoes in said chamber, said clutch chamber having cylindrical side wall portions and said shoes having cylindrical friction clutch faces engageable with the wall portions of the chamber, said shoes having internal beveled faces designed to be operatively associated with such a tapered shoulder means to be radially expanded thereby, and a clamp nut journaled in the mounting head and having a nose extending inwardly into the clutch chamber in opposition to such shoulder means and effectively engaging with the inner ends of the shoes to cooperate with the shoulder means in expanding the cylindrical faces into clutching engagement with the cylindrical side wall portions.

11. A wiper carrying arm for mounting on a shaft having tapered shoulder means, said arm having a die-cast mounting head formed with a shaft receiving clutch chamber, a cupped liner means secured therein and having cylindrical side wall portions, an expansible clutch unit located within the liner means and comprising radially displaceable friction shoes loosely confined by the liner means about the shaft and having cylindrical clutch faces engageable with the cylindrical side wall portions of the confining liner means, said liner means having a part underlying and supporting the shoes against displacement from said clutch chamber, said shoes being expansible against the cylindrical side wall portions of the liner means by the tapered shoulder means when associated with such a shaft, and a clamp nut rotatable in the mounting head and having an inwardly extending nose opposing such tapered shoulder means to cooperate therewith in so expanding the shoes into clutching engagement with the liner means.

12. A windshield wiper arm construction comprising an arm portion, a chamber with a wall in said arm portion, a drive shaft having an end and a portion proximate said end adapted to be positioned within said chamber, a clamping member threadably fastened on said end of said drive shaft, a plurality of radially movable clutch members positioned in said chamber about said drive shaft, each of said clutch members having at each end an inner surface tapering toward an outer surface, each of said outer surfaces being of a curvature for mating engagement with a portion of said chamber wall, first means on said drive shaft engaging said inner surfaces of said clutch members, second means opposed to the first means and spaced therefrom in a direction toward said end of the shaft, said clutch members being positioned between said first and second means, said second means being associated with said clamping member and engaging said clutch members on their other ends for limiting their movement in an axial direction while said clamping member is tightened whereby relative axial movement between said clamping member and said drive shaft causes said first means in conjunction with said second means to convert said axial movement between said clamping member and said drive shaft into radial movement of said clutch members and thereby cause said clutch members to exert a substantially radially directed holding force against the wall of said chamber throughout the major portion of the outer surfaces of said clutch members.

13. A windshield wiper arm mounting construction comprising an arm portion, a chamber in said arm portion, a hollow member in said chamber, said hollow member having a substantially cylindrical wall, means for securing said hollow member in said chamber, a plurality of clutch shoes positioned in said hollow member, said clutch shoes having outer surfaces adapted to engage said substantially cylindrical wall of said hollow member, said clutch shoes also having splined internal surfaces tapering toward said outer surfaces, an underlying member connected to said hollow member for retaining said clutch shoes within the confines of said hollow member, a shaft having a splined shoulder of a taper like said tapering internal surfaces of said clutch shoes for engaging said internal surfaces of said clutch shoes, a threaded portion at the end of said shaft, an internally threaded nut journaled for rotation in said arm portion with the outer end thereof adapted to receive a turning motion and the inner end thereof extending into said chamber, a retaining ring secured to the portion of said retaining nut within said chamber to maintain said nut in journaled relationship on said arm portion whether said nut is or is not in engagement with the threaded portion of said shaft, engaging means within said chamber operatively associated with said threaded nut for engaging the ends of said clutch shoes which are remote from said underlying member, whereby the tightening of said nut member onto the threaded end of said shaft causes said clutch shoes to be confined between the tapered shoulder on said shaft and said engaging means in said chamber to thereby convert the relative axial movement between said nut and said shaft into a radially directed force of said clutch shoes against the inner surfaces of said hollow member.

References Cited

UNITED STATES PATENTS

| | | | |
|---|---|---|---|
| 2,719,047 | 9/1955 | Bayes | 287—53 |
| 1,240,230 | 9/1917 | Luce | 287—53 |
| 2,226,078 | 12/1940 | Spahn | 82—44 |

FOREIGN PATENTS

| | | |
|---|---|---|
| 843,371 | 7/1952 | Germany. |
| 619,319 | 3/1949 | Great Britain. |

CARL W. TOMLIN, *Primary Examiner.*

ANDREW KUNDRAT, *Assistant Examiner.*

U.S. Cl. X.R.

15—250.34; 287—52.06

UNITED STATES PATENT OFFICE
CERTIFICATE OF CORRECTION

Patent No. 3,419,299                          December 31, 1968

John R. Oishei

It is certified that error appears in the above identified patent and that said Letters Patent are hereby corrected as shown below:

Column 1, line 14, "lack" should read -- lock --; line 39, "hench" should read -- hence --. Column 2, line 50, "wiper arm" should read -- wiper drive arm --. Column 4, lines 22 and 52, "face", each occurrence, should read -- faces --; line 69, "positive" should read -- position --. Column 5, line 27, "contrast" should read -- in contrast --; line 62, "tappered" should read -- tapered --. Column 6, line 11, "sections and to" should read -- sections to --; line 72, "turning force the" should read -- turning force, the --. Column 7, line 6, "diecast" should read -- die-cast --.

Signed and sealed this 24th day of March 1970.

(SEAL)
Attest:

Edward M. Fletcher, Jr.                        WILLIAM E. SCHUYLER, JR.
Attesting Officer                                       Commissioner of Patents